(12) United States Patent
Palik

(10) Patent No.: US 9,615,047 B1
(45) Date of Patent: Apr. 4, 2017

(54) DIGITAL READ-OUT INTEGRATED CIRCUIT WITH MODULATED LIGHT SOURCE REJECTION

(71) Applicant: RAYTHEON COMPANY, Waltham, MA (US)

(72) Inventor: Stephen M. Palik, Playa Vista, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/945,625

(22) Filed: Nov. 19, 2015

(51) Int. Cl.
    H04N 5/374 (2011.01)
    H04N 5/378 (2011.01)
    H04N 5/376 (2011.01)
    H04N 5/3745 (2011.01)

(52) U.S. Cl.
    CPC ............. *H04N 5/378* (2013.01); *H04N 5/376* (2013.01); *H04N 5/37452* (2013.01)

(58) Field of Classification Search
    CPC ...... H04N 5/374; H04N 5/3741; H04N 5/378; H04N 5/37452
    See application file for complete search history.

(56) References Cited

U.S. PATENT DOCUMENTS

| 6,922,210 | B2 | 7/2005 | Yang et al. | |
|---|---|---|---|---|
| 8,179,296 | B2 | 5/2012 | Kelly et al. | |
| 8,692,176 | B2 | 4/2014 | Kelly et al. | |
| 8,933,832 | B2 | 1/2015 | Kelly et al. | |
| 2009/0244346 | A1 | 10/2009 | Funaki | |
| 2014/0267884 | A1* | 9/2014 | Shen | H04N 5/2353 348/362 |
| 2015/0229859 | A1* | 8/2015 | Guidash | H04N 5/374 348/308 |
| 2016/0150128 | A1* | 5/2016 | Shaffer | H04N 3/1543 348/295 |
| 2016/0309140 | A1* | 10/2016 | Wang | G01B 11/00 |

OTHER PUBLICATIONS

Notification of Transmittal of the International Search Report and the Written Opinion of the International Searching Authority from corresponding PCT/US2016/037332 dated Aug. 30, 2016.

* cited by examiner

*Primary Examiner* — Tuan Ho
(74) *Attorney, Agent, or Firm* — Lando & Anastasi, LLP

(57) ABSTRACT

According to one aspect, embodiments herein provide a digital pixel circuit comprising a detector configured to discharge a well capacitor when voltage across the well capacitor exceeds a threshold, a DROIC configured, in a first mode, to increment a reset counter when the well capacitor is discharged, and in a second mode, to ignore the discharging of the well capacitor, and a processing unit configured to monitor a count rate of the DROIC, transmit a signal at a first level when the count rate is less than a threshold, and transmit a signal at a second level when the count rate is greater than the threshold, wherein, the DROIC is further configured, in response to receiving the signal at the first level, to operate in the first mode, and in response to receiving the signal at the second level, to operate in the second mode.

20 Claims, 4 Drawing Sheets

DIGITAL READ-OUT INTEGRATED CIRCUIT WITH MODULATED LIGHT SOURCE REJECTION

BACKGROUND

There are many different types of image capturing devices such as digital cameras, video cameras, or other photographic and/or image capturing equipment. These image capturing devices may use image sensors to capture images from a desired scene. For example, an image sensor may include an array of unit cells (i.e., a focal plane array) that receives light via a lens. The received light causes each unit cell in the array to accumulate an electric charge proportional to the light intensity at its location.

A focal plane array typically includes a two-dimensional array of unit cells organized by columns and rows. It is common for a circuit or imager within a unit cell to accumulate charge from a photo-diode, the charge corresponding to the flux of light of various wavelengths incident on the photo-diode. Often, the charge is accumulated on a capacitive element which effectively integrates charge, producing a voltage that corresponds to the intensity of the flux over a given time interval called an integration interval.

Each unit cell in a focal plane array generally corresponds to a picture element, or pixel, in the final image of the desired scene. A pixel is considered the smallest portion of a digital image. A digital image is generally made up of an array of pixels. Circuitry coupled to the image capturing device may perform post light capture processing steps to convert the accumulated charges from each unit cell into pixel information. This information may include the color, saturation, brightness, or other information that a digital image storage format may require. Digital images may be stored in formats such as JPG, .GIF, .TIFF, or any other suitable format.

In a traditional analog pixel (i.e., a traditional analog unit cell), a well capacitor is coupled to a detector diode. The well capacitor integrates photo-current from the detector diode over an integration interval (e.g., 10 µs). Once per frame, the voltage on the well capacitor is transferred to a sample-and-hold capacitor and then transferred out, line by line, to an Analog to Digital Converter (ADC) which converts the voltage to a binary value. However, as pixel sizes (i.e., unit cell sizes) have decreased, the ability of the well capacitor to store an effective amount of charge has diminished.

In-pixel (i.e., in-unit cell) Analog to Digital Conversion (ADC) imaging offers improved photo-charge capacity even as the desired size of pixels (i.e., unit cells) continues to shrink (e.g., below 15 microns). For example, a traditional in-pixel ADC (i.e., a "digital pixel") design includes a quantizing analog front end circuit which accumulates charge over a relatively small capacitor and is reset (i.e., discharged) each time a threshold charge is stored on the capacitor. The pattern of charging and resetting is repeated as more photo-current integrates. Each reset event is "accumulated" (i.e., counted) with a digital counter circuit. Each frame, a global snapshot is taken by copying the digital counter contents to a snapshot register and then reading the snapshot registers out, line by line. The effect is to exponentially increase well capacity of the imager while maintaining a relatively small pixel size.

SUMMARY

Figure 1A:
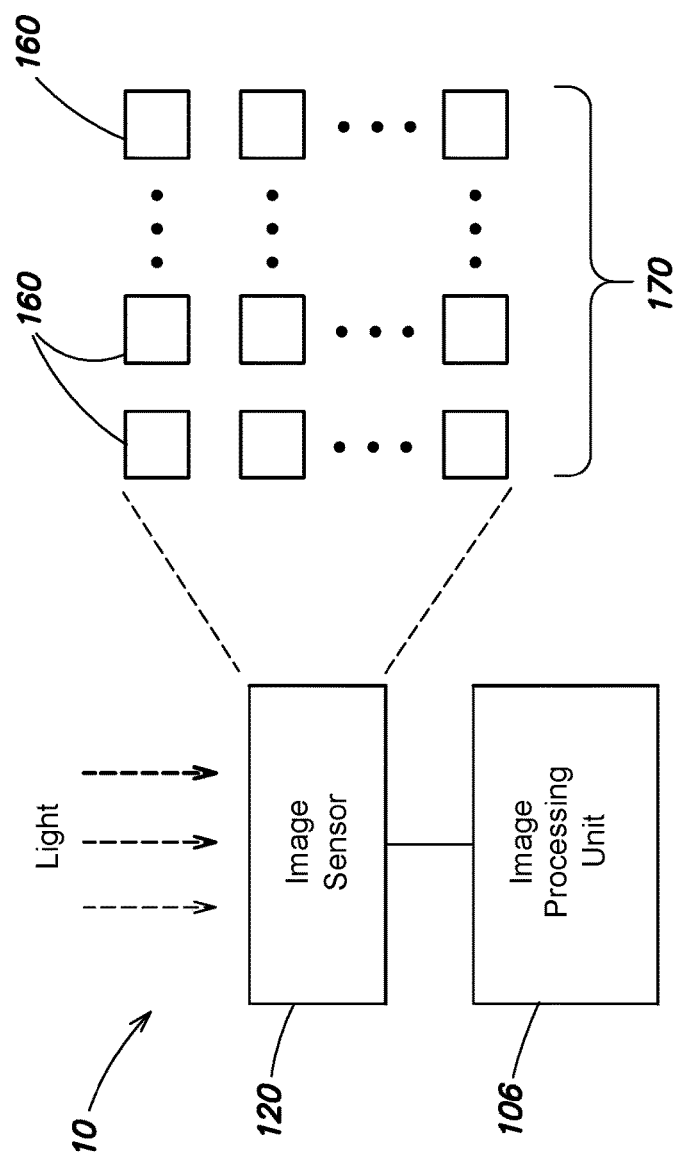
FIG. 1A is a block diagram illustrating an image capture device according to aspects of the invention.

A digital pixel circuit is provided that includes a new "count enable" feature. The digital pixel circuit includes a Digital Readout Integrated Circuit (DROIC) that is capable of counting electric charge reset events (i.e., discharge events) of a corresponding detector. An image processing unit provides a count enable signal to the DROIC that controls when the DROIC is configured to actively count electric charge reset events of the corresponding detector. In one embodiment, a low count enable signal deactivates the reset event counting feature of the DROIC and a high count enable signal activates the reset event counting feature of the DROIC. By adjusting the frequency of the count enable signal to match the frequency of an external modulated or pulsed light source and adjusting the duty cycle of the count enable signal to be opposite that of the external modulated or pulsed light source, the impact of the external modulated or pulsed light source on the imaging information generated by the digital pixel can by minimized or even eliminated.

Aspects and embodiments are directed to a digital pixel circuit comprising a detector including a photodiode coupled to a well capacitor, the well capacitor configured to accumulate charge generated by an input light signal incident on the photodiode and the detector configured to discharge the well capacitor each time a voltage across the well capacitor exceeds a well capacitor threshold value, a Digital Readout Integrated Circuit (DROIC) coupled to the detector and configured, in a first mode of operation, to increment a value of a reset counter each time the well capacitor is discharged, and in a second mode of operation, to ignore the discharging of the well capacitor, and an image processing unit coupled to the DROIC, the image processing unit configured to monitor a count rate at which the DROIC is incrementing the reset counter, transmit a count enable signal at a first level to the DROIC in response to a determination that the count rate of the DROIC is less than a count rate threshold, and transmit a count enable signal at a second level to the DROIC in response to a determination that the count rate of the DROIC is greater than the count rate threshold, wherein, the DROIC is further configured, in response to receiving the count enable signal at the first level, to operate in the first mode of operation, and in response to receiving the count enable signal at the second level, to operate in the second mode of operation.

According to one embodiment, the image processing unit is further configured to periodically retrieve the value of the reset counter from the DROIC. In one embodiment, the image processing unit is further configured to generate image information based at least in part on the retrieved value of the reset counter. In another embodiment, the image processing unit is further configured to transmit the image information to an external electronics module.

According to another embodiment, in the second mode of operation, the image processing unit is configured to implement a search function that identifies a frequency of a modulated light portion of the input light signal and sets a frequency of the count enable signal to match the frequency of the modulated light portion. In one embodiment, the search function of the image processing unit is further configured to set a duty cycle of the count enable signal to be opposite that of a duty cycle of the modulated light portion. In another embodiment, the search function of the image processing unit is further configured to identify the frequency of the modulated light portion by coarsely setting the frequency of the count enable signal based on the determination that the count rate of the DROIC is greater than the count rate threshold. In one embodiment, the search function of the image processing unit is further configured to identify the frequency of the modulated light portion by finely tuning the frequency of the count enable signal to match the frequency of the modulated light portion.

Another aspect is directed to a method for operating a digital pixel circuit comprising a detector including a photodiode and a well capacitor, a DROIC coupled to the detector, and an image processing unit coupled to the DROIC, the method comprising generating charge in response to an input light signal incident on the photodiode, storing the charge in the well capacitor, discharging the well capacitor each time a voltage across the well capacitor exceeds a well capacitor threshold value, incrementing, by the DROIC in a first mode of operation, a value of a reset counter each time the well capacitor is discharged, ignoring, by the DROIC in a second mode of operation, the discharging of the well capacitor, monitoring, by the image processing unit, a count rate at which the DROIC is incrementing the reset counter; transmitting, by the image processing unit to the DROIC, a count enable signal at a first level in response to a determination that the count rate of the DROIC is less than a count rate threshold; transmitting, by the image processing unit to the DROIC, a count enable signal at a second level in response to a determination that the count rate of the DROIC is greater than the count rate threshold, operating the DROIC in the first mode of operation in response to receiving the count enable signal at the first level, and operating the DROIC in the second mode of operation in response to receiving the count enable signal at the second level.

According to one embodiment, the method further comprises periodically retrieving, with the image processing unit, the value of the reset counter from the DROIC. In one embodiment, the method further comprises generating, with the image processing unit, image information based at least in part on the retrieved value of the reset counter. In another embodiment, the method further comprises transmitting the image information to an external electronics module and processing the image information with the external electronics module. In one embodiment, the method further comprises transmitting the processed image information to an end user.

According to another embodiment, the method further comprises implementing a search function of the image processing unit in the second mode of operation to identify a frequency of a modulated light portion of the input light signal and set a frequency of the count enable signal to match the frequency of the modulate light portion. In one embodiment, the method further comprises operating the search function of the image processing unit to set a duty cycle of the count enable signal to be opposite that of a duty cycle of the modulated light portion. In another embodiment, implementing the search function comprises coarsely setting the frequency of the count enable signal based on the determination that the count rate of the DROIC is greater than the count rate threshold. In one embodiment, implementing the search function further comprises finely tuning the frequency of the count enable signal to match the frequency of the modulated light portion.

At least one aspect is directed to an image sensor comprising an array of unit cells, each unit cell comprising a detector including a photodiode coupled to a well capacitor, the well capacitor configured to accumulate charge generated by an input light signal on the photodiode and the detector configured to discharge the well capacitor each time a voltage across the well capacitor exceeds a well capacitor threshold value, and a Digital Readout Integrated Circuit (DROIC) coupled to the detector and capable of incrementing a value of a reset counter when the well capacitor is discharged, an image processing unit coupled to the DROIC of each unit cell and configured to periodically retrieve the value of the reset counter from the DROIC of each unit cell, and means for controlling the DROIC of each unit cell such that the DROIC of each unit cell increments the value of its reset counter when both the corresponding well capacitor is discharged and the discharge of the corresponding well capacitor is not due to a modulated light portion in the input light signal.

According to one embodiment, the means for controlling the DROIC includes means for identifying a frequency of the modulated light portion in the input light signal and for utilizing the frequency of the modulated light portion to determine when the DROIC should increment the reset counter in response to the well capacitor discharging. In another embodiment, the digital pixel circuit further comprises means for generating a digital image based, at least in part, on the value of the reset counter retrieved from the DROIC.

DETAILED DESCRIPTION OF THE INVENTION

As discussed above, an image sensor of an image capture device may include an array of analog or digital pixels (i.e., analog or digital unit cells) that is configured to receive light from a desired scene. The received light causes each pixel (i.e., unit cell) in the array to accumulate an electric charge proportional to the light intensity at its location and image processing circuitry coupled to each pixel converts the accumulated charges into image information corresponding to the desired scene.

If the light received from the desired scene by a conventional image sensor (including analog or digital pixels) includes high intensity modulated or pulsed light (e.g., having a frequency of 10 kHz and a duty cycle less than 100%), the resulting image information may be of poor quality or even unusable. For instance, traditional analog pixels collect charge over a specific dwell (i.e., integration) time, effectively sampling light continuously. A modulated or pulsed external light source (e.g., with a pulse frequency much faster than the integration time of the analog pixels and a duty cycle of 10%) will be fully integrated and appear, in the resulting image information, as a continuous light source. This can negatively impact image quality and any associated post-processing algorithms. In addition, if the intensity of the external pulsed light source results in an analog pixel's well capacity being exceeded, the analog pixel will be effectively saturated.

Traditional digital pixels work by integrating energy in relatively small well capacitors and continuously comparing the accumulated charge against a threshold value. When this threshold is met, the digital pixel's well capacitor is reset and a digital count (e.g., stored in on-pixel memory) is incremented. The well capacitor again continues to accrue charge until the threshold is again met, the well capacitor is reset, and another digital count is recorded. As such, for a typical single image frame, there are considerable (e.g., often tens of thousands) of counts. If the light received by a digital pixel includes modulated or pulsed light, the pulses of light may cause the well capacitor of the digital pixel to charge (to the threshold) and discharge more rapidly, resulting in a higher number of digital counts than if the pulsed light was not present. This false number of digital counts resulting from the pulsed light may impact the quality of images generated based on the digital count total and any associated post-processing algorithms. For example, the false number of digital counts may result in an image that includes very bright (e.g., blinding) pixels that make the image difficult to view.

Classic approaches for mitigating the negative effects of external pulsed light sources include the use of limiters, shutters, and other devices; however, such devices are typically complex, degrade performance, and/or selectively disable operation of pixels (i.e., unit cells) in an image sensor or associated post-processing algorithms associated with an image sensor. Accordingly, a digital pixel circuit is provided that includes a new "count enable" feature. With the count enable feature, digital counts are only recorded to memory when both the well capacitor threshold is met and the count enable feature is true. By adjusting the frequency of the count enable feature to match the frequency of an external modulated or pulsed light source and adjusting the duty cycle of the count enable feature to be opposite that of the external modulated or pulsed light source, the impact of the external modulated or pulsed light source on the imaging information generated by the digital pixel can by minimized or even eliminated.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1A is a block diagram illustrating an image capture device 10 that may be used to capture images according to aspects described herein. For example device 10 may be a digital camera, video camera, or other photographic and/or image capturing equipment. Image capture device 10 comprises image sensor 120 and image processing unit 106. Image sensor 120 may be an Active Pixel Sensor (APS) or other suitable light sensing device that can capture images. Image processing unit 106 may be a combination of hardware, software, and/or firmware that is operable to receive signal information from image sensor 120 and convert the signal information into a digital image.

Image sensor 120 includes an array 170 of unit cells 160. Each unit cell 160 accumulates charge proportional to the light intensity at that location in the field of view and provides an indication of the intensity of light at that location to the image processing unit 106. Each unit cell 160 may correspond to a pixel in the captured electronic image.

A particular method for image capture using image capture device 10 may be ripple capture. Ripple capture is a method that captures each row of pixels from image sensor 120 in order. For example, ripple capture may expose the top row of pixels of image sensor 120 to light, followed by the second row, followed by the third row, and so forth until the last row of pixels of image sensor 120 is exposed to light. Another particular method for image processing unit 14 to receive pixel information captured by image sensor 120 may be ripple read. Ripple read is a method that processes each row of pixels from image sensor 120 in order. Similar to ripple capture, ripple read may process the top row of pixels of image sensor 120, followed by the second row, followed by the third row, and so forth until the last row of pixels of image sensor 120 is processed. A ripple reset operation to reset the rows of pixels of image sensor 120 may be performed similarly.

These methods may be performed on consecutive rows. For example, a ripple capture operation may begin with the first row of image sensor 120. As the ripple capture operation moves to the second row, a ripple read operation may begin on the first row of image sensor 120. After the ripple capture operation moves to the third row, the ripple read operation may begin on the second row and a ripple reset operation may begin on the first row. This may continue until the last row is processed. Once the last row is processed, the image may be processed, stored, and/or transmitted by the image processing unit 106.

Figure 1B:
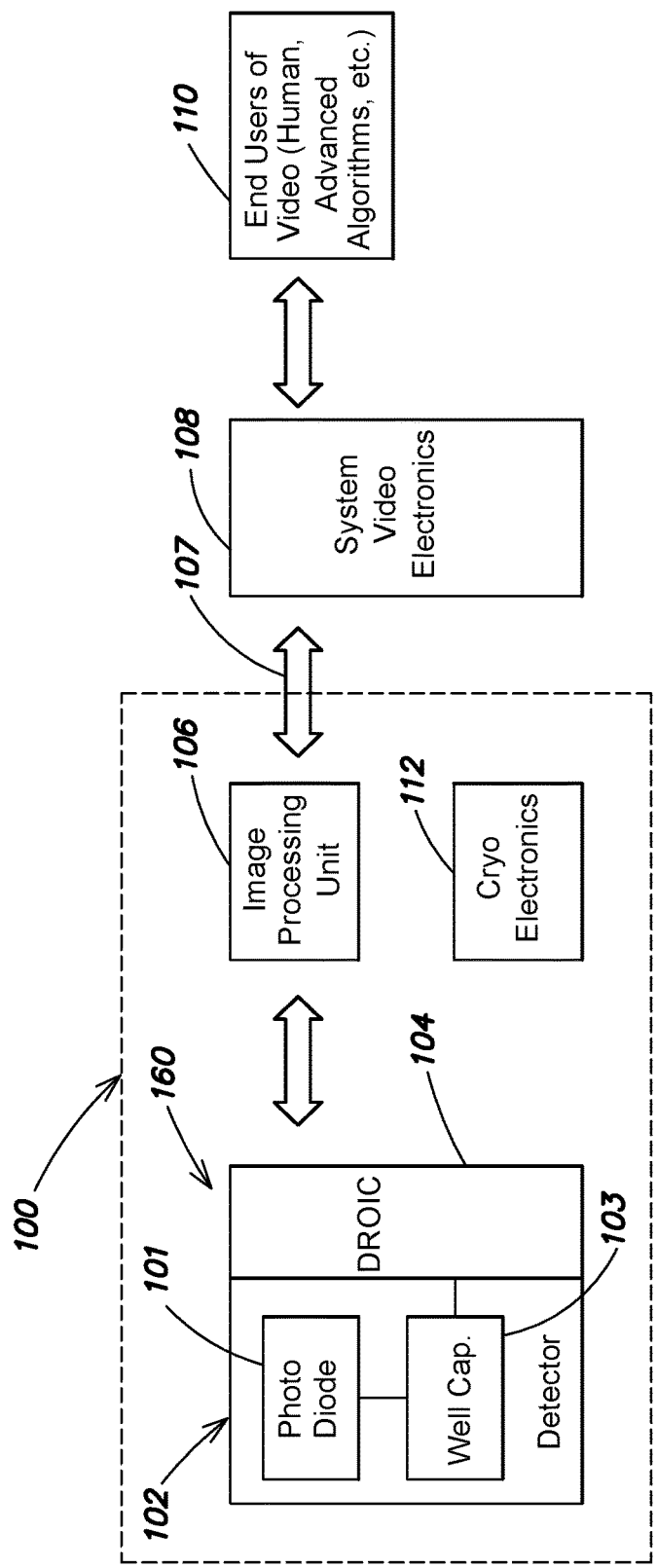
FIG. 1B is a block diagram illustrating a digital pixel circuit according to aspects of the invention.

FIG. 1B is a block diagram illustrating a digital pixel circuit 100 according to aspects described herein. The digital pixel circuit 100 includes one of the unit cells 160 and the image processing unit 106. The unit cell 160 includes an image detector 102 and a Digital Readout Integrated Circuit (DROIC) 104. The image detector 102 includes a photodiode 101, a well capacitor 103 coupled to the photodiode, and other components, as discussed above. The image detector 102 is coupled to a corresponding DROIC 104. The DROIC 104 is coupled to the image processing unit 106. The image processing unit 106 is configured to be coupled to an external system video electronics module 108 via an interface 107. According to at least one embodiment, the digital pixel circuit 100 also includes a cryo-electronics module 112 that is configured to control the temperature of the DROIC 104; however, in other embodiments, the cry-electronics module 112 may not be included.

Figure 2:
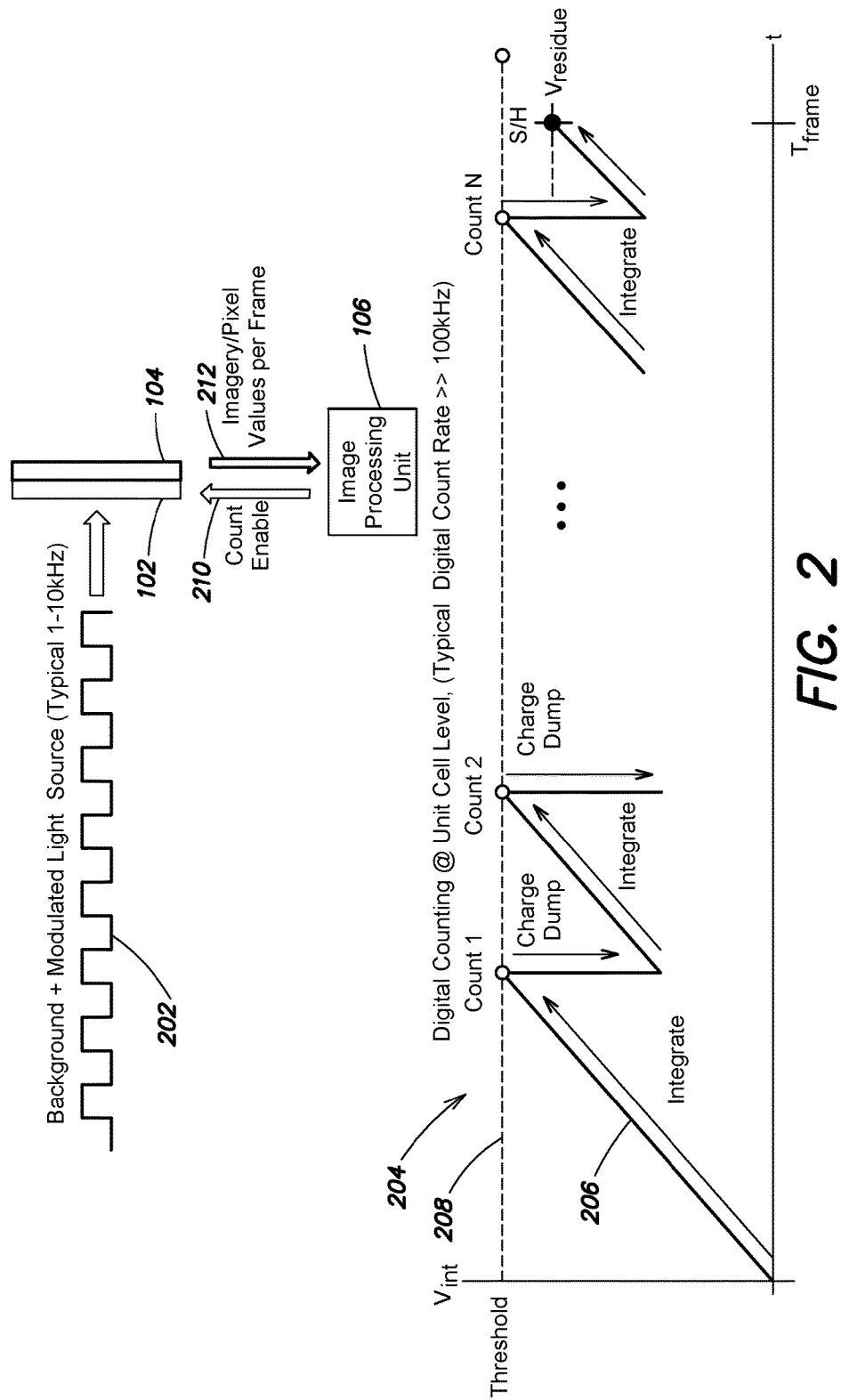
FIG. 2 is a block diagram illustrating operation of a digital pixel circuit according to aspects of the invention.
Figure 3:
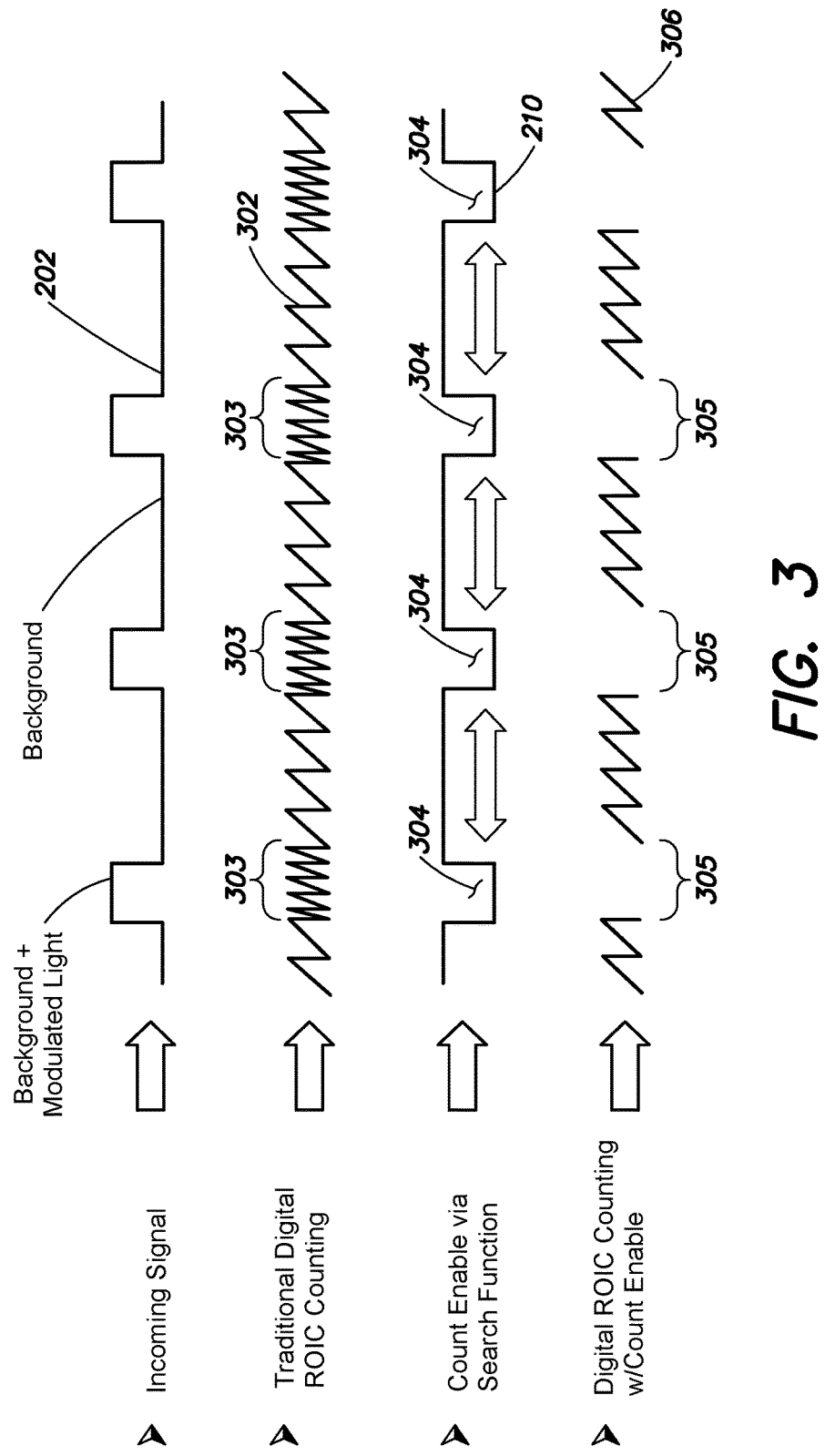
FIG. 3 is a graph illustrating operation of a digital pixel circuit according to aspects of the invention.

FIG. 2 is a block diagram illustrating operation of the digital pixel circuit 100 with respect to an input light signal 202 (including background and modulated light) incident on the detector 102, a count enable signal 210 transmitted from the image processing unit 106 to the DROIC 104, DROIC 104 total reset count values 212, and a graph 204 including a trace 206 representing voltage across the well capacitor of the detector 102 as the input light signal 202 is incident on the detector 102. FIG. 3 is a graph including a first trace representing the input light signal 202 (including background and modulated light), a second trace representing reset events 302 counted by a traditional DROIC 104, a third trace representing the count enable signal 210 from the image processing unit 106 to the DROIC 104, and a fourth trace representing reset events 306 counted by the DROIC 104. Operation of the digital pixel circuit 100 is described below with regard to FIGS. 1, 2, and 3.

The detector 102 is arranged to receive light from a desired scene. The light received from the scene may include background light from the scene and/or pulsed light from a modulated light source in the scene. The background and modulated light from the scene are received by the detector 102 as an input light signal 202 including both the background and the modulated (i.e., pulsed) light. In one embodiment, the input light signal 202 has a frequency of 1-10 kHz; however, in other embodiments, the input light signal 202 may have different characteristics. As the input light signal 202 (including background and modulated light) is incident on the detector 102 (e.g., via a lens adjacent the detector 102), the detector 102 accumulates an electric charge (e.g. generated by its photodiode 101 and stored in its well capacitor 103) proportional to the intensity of the light incident on the digital pixel. As charge accumulates on the detector 102 (i.e., on the well capacitor 103 of the detector 102), the voltage 206 across the well capacitor increases (e.g., as shown in the graph 204 of FIG. 2).

When the detector 102 begins to integrate the input light signal 202, the image processing unit 106 transmits a high count enable signal 210 to the DROIC 104. The high count enable signal 210 activates an integration reset counting feature of the DROIC 104. More specifically, when the count enable signal 210 is high, the DROIC 104 actively counts reset events of the detector 102. For example, as shown in the graph 204 of FIG. 2, when the voltage 206 across the well capacitor reaches a predefined integration threshold 208 and the count enable signal 210 is high, the detector 102 discharges the capacitor and the DROIC 104 increments a reset counter. Assuming light is still incident on the detector 102, the detector 102 again accumulates charge. When the voltage 206 across the well capacitor again reaches the predefined integration threshold 208 and the count enable signal 210 is still high, the detector 102 discharges the well capacitor and the DROIC 104 again increments the reset counter. As shown in the graph 204, this cycle may continue until the entire input light signal 202 has been integrated. According to one embodiment, DROIC 104 increments the reset counter at a rate of at least 100 kHz; however, in other embodiments, the DROIC 104 increments the reset counter at some other frequency.

The image processing unit 106 monitors the rate at which the DROIC 104 increments the reset counter (i.e., the count rate of the DROIC 104). If the count rate of the DROIC 104 does not exceed a count rate threshold, the image processing unit 106 maintains the count enable signal 210 in a high state. When the count enable signal is maintained at a high state, the DROIC 104 actively counts reset events (i.e., increments the reset counter) of the detector 102. If the count rate of the DROIC 104 exceeds the count rate threshold, the image processing unit 106 transmits a low count enable signal 210 to the DROIC 2014. The low count enable signal 210 deactivates the integration reset counting feature of the DROIC 104. More specifically, when the count enable signal 210 is low, the DROIC 104 ignores (i.e., does not count) reset events of the detector 102. For example, when the voltage 206 across the well capacitor reaches a predefined integration threshold 208 and the count enable signal 210 is low, the detector 102 discharges the capacitor, but the DROIC 104 does not increment the reset counter. When the count rate of the DROIC 104 again drops below the count rate threshold, the image electronics module 106 again transmits a high count enable signal 210 to the DROIC 104 and the DROIC 104 again counts reset events of the detector 102.

Periodically (e.g., once per frame), the image processing unit 106 retrieves the value 212 of the DROIC's 104 reset counter (i.e., the number of times that the DROIC 104 has counted a reset event of the detector 102). As shown in FIG. 1, the image processing unit 106 is coupled to the single DROIC 104 (of the single unit cell 160); however where the image processing unit 106 is coupled to each unit cell 160 in the array 170 of unit cells 160 (i.e., to the DROIC 104 and corresponding detector 102 of each unit cell 160), the image processing unit 106 is configured to periodically retrieve reset counter values from each DROIC 104 in the array 170. The image processing unit 106 processes the retrieved reset counter values from each DROIC 104 in the array to generate image information (e.g., a digital image) based on the reset counter value(s). The image processing unit 106 may transmit the image information to an external imaging/video system 108. The external imaging/video system 108 may further process the image information and/or transmit the image information to an end user 110. The end user may be an individual user or a system that is configured to analyze and/or further process the image information (e.g., via advanced algorithms).

A count rate of the DROIC 104 that is above the count rate threshold may indicate that the input light signal 202 received by the detector 102 includes modulated light. Without accounting for such modulated light, the resulting value of the DROICs reset counter retrieved by the image processing unit 106 may be artificially inflated. For example, as shown in the graph of FIG. 3, with a traditional DROIC that does not account for modulated light in the input signal 202, the reset counter of the DROIC is incremented for all reset events 302 of the detector, including resets 303 occurring at a faster rate due to the modulated light. By counting every reset, including the resets due to the modulated light, the total number of resets counted by the DROIC is inflated, potentially resulting in a degradation of the quality of any resulting image based on the total number of resets.

Alternatively, by deactivating the integration reset counting feature of the DROIC 104 during the periods of time 305 when the count rate of the DROIC 104 is above the count rate threshold (as described above), the number of reset events 306 counted by the DROIC 104 may more accurately reflect the light information of the scene being viewed. For example, as shown in the graph of FIG. 3, when the count enable signal 210 is low (e.g., the low portions 304) because the image processing unit 106 has identified the count rate of the DROIC 104 to be above the count rate threshold, the DROIC 104 does not count reset events of the detector 102. As such, only reset events 306 corresponding to the background light of the input signal 202 are counted by the DROIC 104, thereby minimizing the effect of modulated light in the input signal 202 on the resulting total number of reset events 212 counted by the DROIC 104 (and on any resulting image generated by the image processing unit) and transmitted to the image processing unit 106. According to one embodiment, operation of the digital pixel circuit 100 as described above may result in a reduced Signal to Noise Ratio (SNR) due to reduced equivalent integration time; however, such a decrease in SNR is generally outweighed by the ability to operate an imager in the presence of a modulated light source that would otherwise degrade or disable operation of the imager.

According to one embodiment, the image processing unit 106 sets the count enable signal 210 low when the count rate of the DROIC 104 is determined to be above the count rate threshold and sets the count enable signal 210 high when the count rate of the DROIC 104 is determined to be below the count rate threshold. However, in other embodiments, the image processing unit 106 attempts to configure the count enable signal to have a frequency that matches that of the modulated light in the input signal 202 and a duty cycle that is opposite to that of the modulated light in the input signal 202. In this way, the modulated light in the input signal can be dealt with more completely as the image processing unit 106 can anticipate the modulated light instead of waiting for the count rate of the DROIC to increase above the count rate threshold.

In one embodiment, the image processing unit 106 operates a search function to identify the frequency of the modulated light in the input signal 202. The search function utilizes a "trial and error" approach to identify the frequency of the modulated light in the input signal 202. For example, upon the image processing unit 106 first identifying that the count rate of the DROIC 104 is above the count rate threshold, the search function of the image processing unit 106 utilizes the identification of the above-threshold count rate to coarsely set the frequency and duty cycle of the count enable signal 210. The search function subsequently makes fine changes to the frequency of the count enable signal 210 (i.e., increasing and/or decreasing the frequency) in an attempt to match the frequency of the count enable signal 210 to the frequency of modulated light in the input signal 202.

Each time the search function adjusts the frequency of the count enable signal 210, the search function determines if the resulting count enable signal 210 matches the frequency of the modulated light in the input signal 202 (identified by the resets 303 occurring at a faster rate due to the modulated light). If the frequency of the count enable signal 210 does not match the frequency of the modulated light, the search function continues to finely adjust (i.e., increase and/or decrease) the frequency of the count enable signal 210. If the frequency of the count enable signal 210 does match the frequency of the modulated light, the count enable signal 210 continues to be transmitted to the DROIC 104 (i.e., deactivating the reset counting feature of the DROIC 104) at the matched frequency and with a duty cycle opposite to that of the modulated light.

As described above, the search function of the image processing unit 106 identifies the frequency of the modulated light portion of the input signal 202 by first coarsely setting the frequency of the count enable signal 210 and then finely tuning the count enable signal 210 to more completely cover the entire modulated light portion of the input signal 202. However, in other embodiments, the search function may not finely tune the frequency of the count enable signal 210 and may instead only coarsely set the frequency of the count enable signal 210 based on the identification that the count rate of the DROIC 104 is above the count rate threshold.

By matching the frequency of the count enable signal transmitted to the DROIC 104 with the frequency of the modulated light in the input signal 202 and configuring the count enable signal to have an opposite duty cycle to that of the modulated light, the reset counting feature of the DROIC 104 can automatically be deactivated to prevent the modulated light from impacting the total number of resets counted by the DROIC and as a result, the impact on any corresponding images generated based on the total number of resets counted by the DROI 104 may be minimized, if not eliminated.

As described above, the DROIC 104 and the imaging processing unit 106 are separate components; however, in at least one embodiment, the DROIC 104 performs the functions of the image processing unit 106 described above.

As described above, a low count enable signal deactivates the reset counting feature of the DROIC while a high count enable signal activates the reset counting feature of the DROIC; however, in other embodiments, a high count enable signal deactivates the reset counting feature of the DROIC while a low count enable signal activates the reset counting feature of the DROIC.

According to at least one embodiment, the digital pixel circuit described above is utilized in Electro-Optical (EO) imaging systems such as Air-Air, Air-Ground, and Space-Ground imaging systems. For example, the digital pixel circuit may be utilized in an imager of an aircraft to prevent the imager of the aircraft from being "blinded" by a high intensity modulated light source (e.g., a laser). In other embodiment, the digital pixel circuit may be utilized in any other EO based imaging systems.

A digital pixel circuit is provided that includes a new "count enable" feature. The digital pixel circuit includes a Digital Readout Integrated Circuit (DROIC) that is capable of counting electric charge reset events of a corresponding detector. An image processing unit provides a count enable signal to the DROIC that controls when the DROIC is configured to actively count electric charge reset events of the corresponding detector. With the count enable feature, digital counts are only recorded by the DROIC when both the well capacitor threshold of the detector is met and the count enable feature is true (i.e., the charge stored on the detector is not a result of modulated light). According to one embodiment, the image processing unit sets the frequency of the count enable signal to match that of a modulated light source. By adjusting the frequency of the count enable feature to match the frequency of an external modulated or pulsed light source and adjusting the duty cycle of the count enable feature to be opposite that of the external modulated or pulsed light source, the impact of the external modulated or pulsed light source on the imaging information generated by the digital pixel can by minimized or even eliminated.

What is claimed:
1. A digital pixel circuit comprising:
  a detector including a photodiode coupled to a well capacitor, the well capacitor configured to accumulate charge generated by an input light signal incident on the photodiode and the detector configured to discharge the well capacitor each time a voltage across the well capacitor exceeds a well capacitor threshold value;
  a Digital Readout Integrated Circuit (DROIC) coupled to the detector and configured, in a first mode of operation, to increment a value of a reset counter each time the well capacitor is discharged, and in a second mode of operation, to ignore the discharging of the well capacitor; and
  an image processing unit coupled to the DROIC, the image processing unit configured to monitor a count rate at which the DROIC is incrementing the reset counter, transmit a count enable signal at a first level to the DROIC in response to a determination that the count rate of the DROIC is less than a count rate threshold, and transmit a count enable signal at a second level to the DROIC in response to a determination that the count rate of the DROIC is greater than the count rate threshold,
  wherein, the DROIC is further configured, in response to receiving the count enable signal at the first level, to operate in the first mode of operation, and in response to receiving the count enable signal at the second level, to operate in the second mode of operation.
2. The digital pixel circuit of claim 1, wherein the image processing unit is further configured to periodically retrieve the value of the reset counter from the DROIC.

3. The digital pixel circuit of claim 2, wherein the image processing unit is further configured to generate image information based at least in part on the retrieved value of the reset counter.

4. The digital pixel circuit of claim 3, wherein the image processing unit is further configured to transmit the image information to an external electronics module.

5. The digital pixel circuit of claim 1, wherein in the second mode of operation, the image processing unit is configured to implement a search function that identifies a frequency of a modulated light portion of the input light signal and sets a frequency of the count enable signal to match the frequency of the modulated light portion.

6. The digital pixel circuit of claim 5, wherein the search function of the image processing unit is further configured to set a duty cycle of the count enable signal to be opposite that of a duty cycle of the modulated light portion.

7. The digital pixel circuit of claim 5, wherein the search function of the image processing unit is further configured to identify the frequency of the modulated light portion by coarsely setting the frequency of the count enable signal based on the determination that the count rate of the DROIC is greater than the count rate threshold.

8. The digital pixel circuit of claim 7, wherein the search function of the image processing unit is further configured to identify the frequency of the modulated light portion by finely tuning the frequency of the count enable signal to match the frequency of the modulated light portion.

9. A method for operating a digital pixel circuit comprising a detector including a photodiode and a well capacitor, a DROIC coupled to the detector, and an image processing unit coupled to the DROIC, the method comprising:
  generating charge in response to an input light signal incident on the photodiode;
  storing the charge in the well capacitor;
  discharging the well capacitor each time a voltage across the well capacitor exceeds a well capacitor threshold value;
  incrementing, by the DROIC in a first mode of operation, a value of a reset counter each time the well capacitor is discharged;
  ignoring, by the DROIC in a second mode of operation, the discharging of the well capacitor;
  monitoring, by the image processing unit, a count rate at which the DROIC is incrementing the reset counter;
  transmitting, by the image processing unit to the DROIC, a count enable signal at a first level in response to a determination that the count rate of the DROIC is less than a count rate threshold;
  transmitting, by the image processing unit to the DROIC, a count enable signal at a second level in response to a determination that the count rate of the DROIC is greater than the count rate threshold;
  operating the DROIC in the first mode of operation in response to receiving the count enable signal at the first level; and
  operating the DROIC in the second mode of operation in response to receiving the count enable signal at the second level.

10. The method of claim 9, further comprising periodically retrieving, with the image processing unit, the value of the reset counter from the DROIC.

11. The method of claim 10, further comprising generating, with the image processing unit, image information based at least in part on the retrieved value of the reset counter.

12. The method of claim 11, further comprising transmitting the image information to an external electronics module and processing the image information with the external electronics module.

13. The method of claim 12, further comprising transmitting the processed image information to an end user.

14. The method of claim 9, further comprising implementing a search function of the image processing unit in the second mode of operation to identify a frequency of a modulated light portion of the input light signal and set a frequency of the count enable signal to match the frequency of the modulate light portion.

15. The method of claim 14, further comprising operating the search function of the image processing unit to set a duty cycle of the count enable signal to be opposite that of a duty cycle of the modulated light portion.

16. The method of claim 14, wherein implementing the search function comprises coarsely setting the frequency of the count enable signal based on the determination that the count rate of the DROIC is greater than the count rate threshold.

17. The method of claim 16, wherein implementing the search function further comprises finely tuning the frequency of the count enable signal to match the frequency of the modulated light portion.

18. An image sensor comprising:
  an array of unit cells, each unit cell comprising:
    a detector including a photodiode coupled to a well capacitor, the well capacitor configured to accumulate charge generated by an input light signal on the photodiode and the detector configured to discharge the well capacitor each time a voltage across the well capacitor exceeds a well capacitor threshold value; and
    a Digital Readout Integrated Circuit (DROIC) coupled to the detector and capable of incrementing a value of a reset counter when the well capacitor is discharged;
  an image processing unit coupled to the DROIC of each unit cell and configured to periodically retrieve the value of the reset counter from the DROIC of each unit cell; and
  means for controlling the DROIC of each unit cell such that the DROIC of each unit cell increments the value of its reset counter when both the corresponding well capacitor is discharged and the discharge of the corresponding well capacitor is not due to a modulated light portion in the input light signal.

19. The digital pixel circuit of claim 18, wherein the means for controlling the DROIC includes means for identifying a frequency of the modulated light portion in the input light signal and for utilizing the frequency of the modulated light portion to determine when the DROIC should increment the reset counter in response to the well capacitor discharging.

20. The digital pixel circuit of claim 18, further comprising means for generating a digital image based, at least in part, on the value of the reset counter retrieved from the DROIC.

* * * * *